Jan. 18, 1955  L. B. NEIGHBOUR ET AL  2,699,947
MANURE SPREADER BODY CONSTRUCTION
Filed Aug. 17, 1951  2 Sheets-Sheet 1

INVENTORS:
LEONARD B. NEIGHBOUR
MAURICE J. MARTENS
BY
ATTORNEY

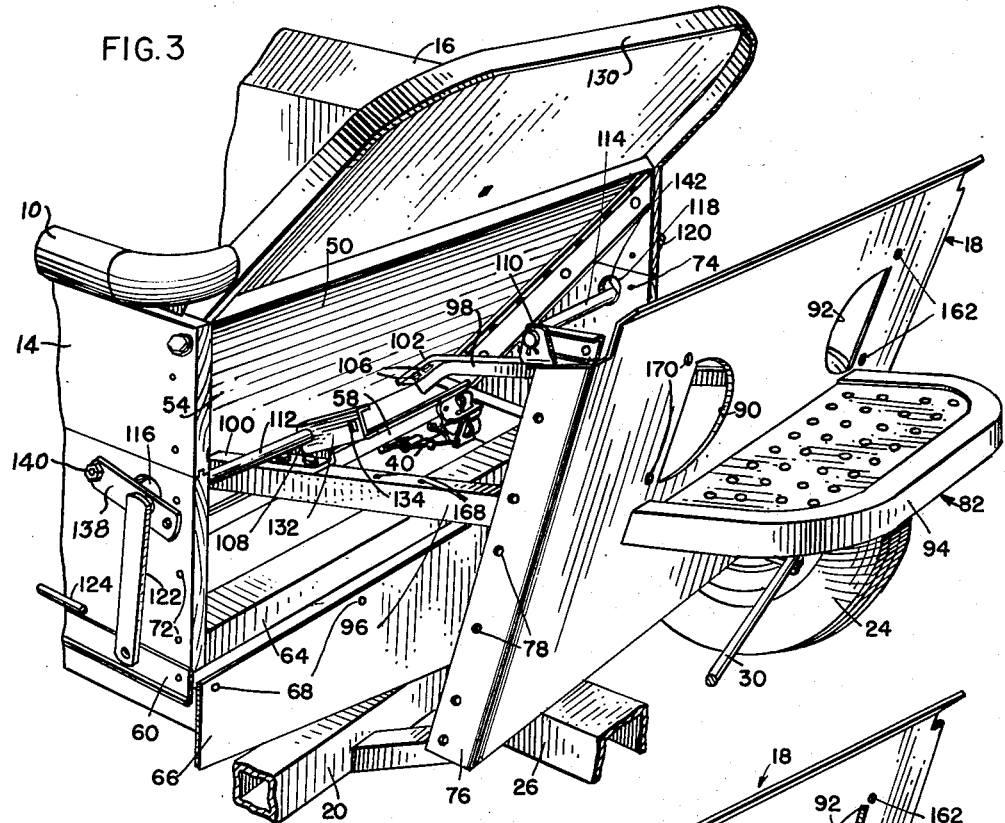
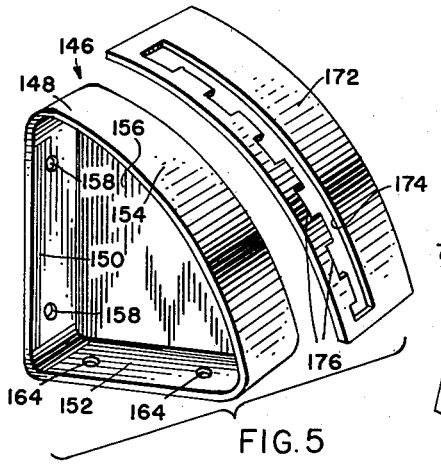

United States Patent Office 2,699,947
Patented Jan. 18, 1955

2,699,947

MANURE SPREADER BODY CONSTRUCTION

Leonard B. Neighbour, Moline, and Maurice J. Martens, East Moline, Ill., assignors to Deere & Company, Moline, Ill., a corporation of Illinois Application August 17, 1951, Serial No. 242,376

5 Claims. (Cl. 275—3)

This invention relates to a vehicle body construction and more particularly to a front end construction for a vehicle of the type used for spreading manure on farm land.

The invention contemplates and has for a principal object the provision of improved structure for carrying an operator's platform and control means incident thereto. The conventional spreader comprises a longitudinal body having upright side walls and a transverse front wall. The rear end of the body is open, of course, and beating and spreading mechanism is arranged at the rear end for disintegrating and spreading the manure as the vehicle is drawn over the field. There is conventionally provided some means operative rearwardly over the floor of the body for advancing the load to the beating and spreading mechanism. The feeding and beating mechanisms are normally separately controlled and for this purpose the typical spreader will include a pair of separate control levers. In the case of a two-wheel spreader normally connected directly behind a tractor, for example, the control levers will be at the front end of the body and accessible to the tractor operator. In the case of a four-wheel spreader, the control levers are similarly mounted at the front end of the spreader but are accessible to an operator carried on an operator's station mounted at the front end of the body apart from the tractor, since a spreader of this character is usually drawn by a team of horses. It is to a spreader of the latter type that the present invention particularly relates.

It is a feature of the present construction that the longitudinal body is separated by a transverse partition wall into the rear and front compartments. The rear compartment is relatively large and carries the load; the front compartment is relatively small and houses certain portions of the controllable mechanism for effecting ultimate operation of the feeding and beating mechanisms. The front of the front compartment is enclosed by a transverse upright front wall having openings therein through which extend the control levers for the mechanisms referred to. The front wall has additional openings therein through which extend the supports or legs of an operator's platform. The arrangement is such that the operator's platform is ahead of the front wall and the legs or supports thereof extend rearwardly through and beyond the front wall for connection to the transverse partition wall. Those portions of the platform supports or legs contained within the front compartment serve also to carry transversely aligned rockshafts for the feeding and beating mechanisms. The rear ends of the levers are connected to the rockshafts and extend outwardly through the aforementioned openings. The platform is additionally braced by means of a pair of sectors transversely spaced on the order of the transverse spacing of the levers and rigidly secured in bracing relationship between the front wall and the platform at the intersection of the two. Thus, the platform is carried at longitudinally spaced points by a simple and efficient construction in which several of the components have dual functions. Not only is the structure featured by simplicity and strength but the appearance of the spreader is materially enhanced. A seat is carried by the front wall at a convenient level above the platform, which platform includes a foot board for the operator. The design further features ease of assembly and disassembly.

The foregoing and other important objects and desirable features inherent in and encompassed by the invention will appear as a disclosure of a preferred embodiment is fully made in the following detailed description and accompanying sheets of drawings in which Figure 1 is a three-quarter perspective view of a spreader of the type referred to above;

Figure 2 is a similar perspective view showing only the front portion of the spreader and illustrating the components in a state of partial assembly;

Figure 3 follows Figure 2 and shows a successive stage of the assembly of the front end construction;

Figure 4 is a detailed perspective view of the transverse front wall; and

Figure 5 is an exploded perspective view showing the components of one of the combination sectors and braces.

Figure 1:
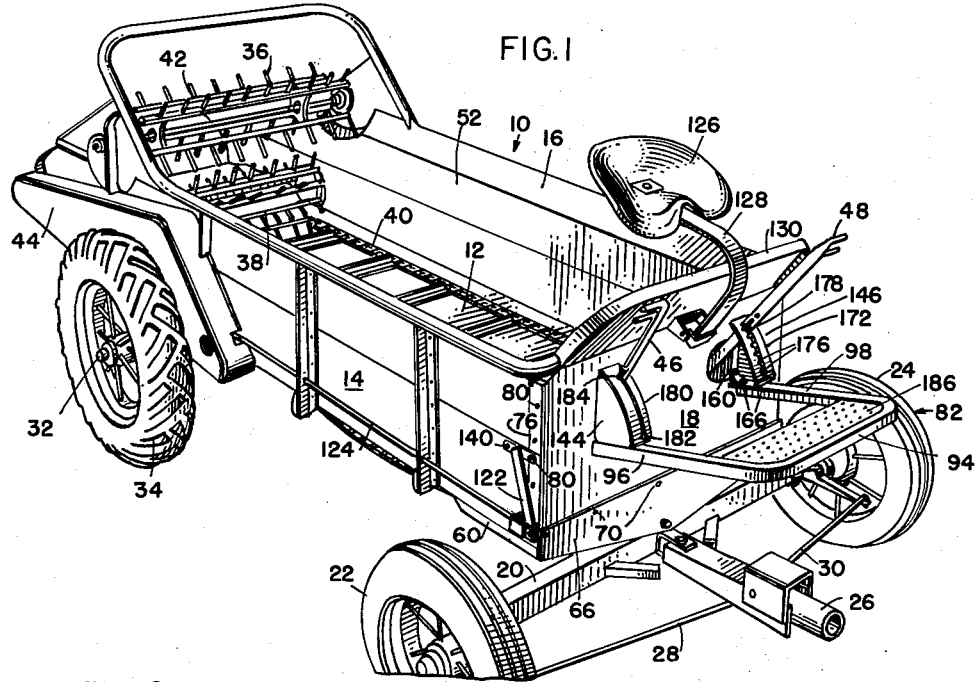

The spreader disclosed herein comprises a longitudinal body 10 made up of a floor or bottom 12, right- and left-hand, longitudinal upright side walls 14 and 16, respectively, and a transverse front wall 18. The front end of the body is carried on a transverse axle 20 having right- and left-hand steerable wheels 22 and 24. A forwardly extending tongue 26 enables the spreader to be drawn by a tractor or a team of horses. The tongue has steering connections 28 and 30 respectively with the wheels 22 and 24.

The rear end of the spreader is carried on a transverse axle 32 supported at opposite ends by a pair of rear wheels, only the right-hand one of which appears at 34.

The rear end of the body 10 is open and carries a plurality of beaters 36 and 38 that serve to receive the manure as the load is advanced rearwardly by a feeding apron 40. Partly visible in Figure 1 is a transversely disposed spreading auger 42 that serves to spread the material both laterally and rearwardly, as is conventional.

Many of the details described above form no part of the present invention and may be of any suitable design, as illustrated, for example, in the U. S. Patent to Brown 2,342,837. In such conventional construction, the apron 40 is advanced rearwardly in increments by feeding mechanism driven by the left-hand rear wheel (neither of which is shown here). The beaters 36 and 38 and the spreading auger 42 are driven from the right-hand wheel 34 by suitable mechanism enclosed within a shield 44.

The beating and spreading mechanism must at times be disengaged from its driving connection to the right-hand wheel 34, and for this purpose a control lever 46 is provided at the front of the spreader body. A second control lever 48 is utilized for varying the increments of feed of the feeding mechanism comprising the apron 40. Further details of the mounting of the levers will appear immediately below.

A transverse support in the form of a partition wall 50 (Figures 2 and 3) separates the body 10 into a rear compartment 52 and a forward compartment 54. As will be seen, the rear compartment is considerably larger than the front compartment and is the main load-carrying part of the body. The transverse partition wall 50 extends or inclines downwardly and rearwardly from upper transversely alined end portions of the side walls 14 and 16 and has a transverse lower portion 56 spaced closely above the floor 12 so as to permit transverse slats 58 on the apron 40 to pass thereunder as the apron moves rearwardly.

Figure 2:
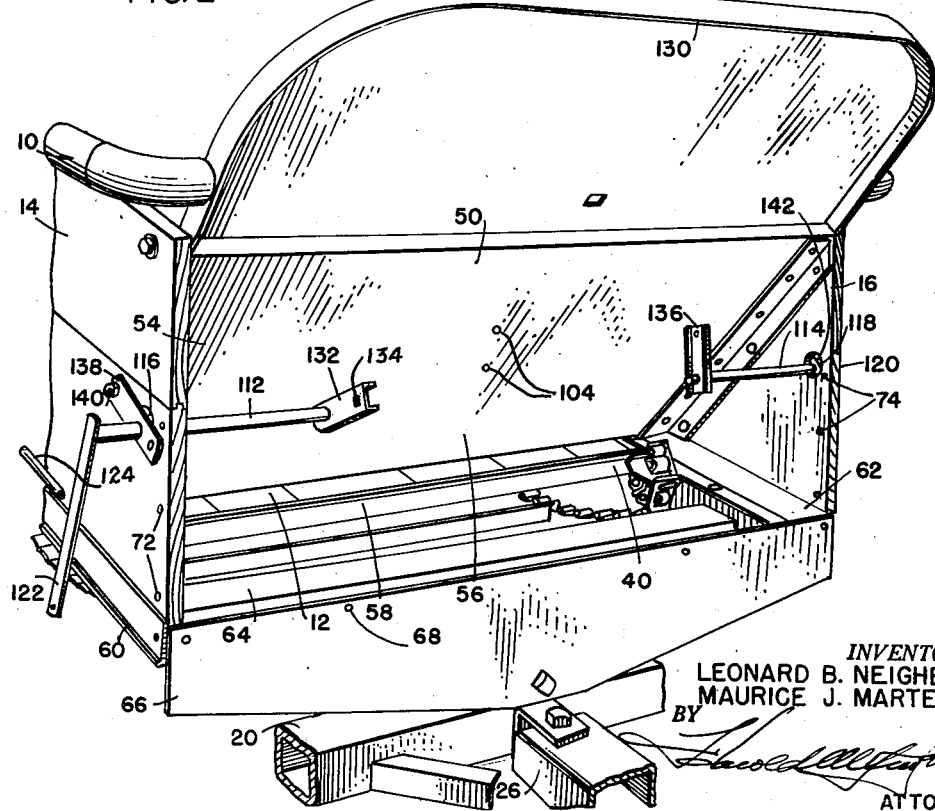

As best shown in Figure 2, the body has a pair of longitudinally running, transversely spaced side sills 60 and 62 that are coextensive with the upright side walls 14 and 16. Therefore, the forward portions of the side sills 60 and 62 extend ahead of the bottom 12 and also ahead of the lower portion 56 of the transverse partition wall 50. The forward ends of the sills 60 and 62 are cross-connected by a transverse beam 64 to which is secured a transverse bolster plate 66. The plate is provided with a plurality of apertures 68 (Figures 2 and 3) that respectively receive securing means in the form of a plurality of bolts 70 (Figure 1).

The transversely alined front ends of the side walls 14 and 16 are respectively provided with pluralities of bolt openings 72 and 74 for receiving bolts to mount the front wall 18. For this purpose, the front wall is flanged at each of its upright outer edges, only the right-hand flange appearing at 76 in Figures 1 and 3. This flange has a plurality of bolt openings 78 alinable with the bolt openings 72 for receiving a plurality of securing means in the form of bolts 80 (Figure 1). It will be understood, of course, that the arrangement at the left-hand side of the body is similar. It will also be seen that when the front wall 18 is secured in place, it forms a closure for the front of the compartment 54.

The upright front wall 18 is preferably of relatively heavy gauge sheet metal, and as shown in Figure 4, is perforated so as to have several openings for facilitating assembly and disassembly and simple and adequate mounting of an operator's platform 82 and the control levers 46 and 48. In addition to the bolt openings 78 in the edge flange 76 (besides those in the corresponding edge flange at the left-hand side thereof) the front wall 18 has a row of bolt openings 84 at its lower edge. These are alinable respectively with the openings 68 in the transverse bolster plate 66 and receive the plurality of bolts 70 (Figure 1).

The front wall 18 further has a first pair of apertures 86 and 88 and a second pair of apertures 90 and 92. The apertures 86 and 88 are spaced transversely apart and are at a level above the lower portion 56 of the partition wall 50. Thus, the level of these apertures is above the level of the floor or bottom 12. The operator's platform 82 is in the form of a U-shaped member having a bight 94 and a pair of legs 96 and 98. When assembled, the platform 82 has its bight 94 disposed ahead of the front wall 18 and the legs 96 and 98 provide longitudinally rearwardly extending supports that pass respectively through the apertures 86 and 88 in the front wall 18 and into the compartment 54. The legs 96 and 98 respectively have rear end portions 100 and 102 and are supportingly connected to the lower portion 56 of the transverse partition wall 50. As will be seen in Figure 2, the partition wall 50 has a pair of spaced apertures 104 for receiving a pair of bolts 106 (Figure 3) that secure the left-hand rear end leg portion 102 to the partition wall 50. Although not visible, a similar arrangement is provided toward the right-hand side of the partition wall 50.

Those portions of the platform supporting legs 96 and 98 within the compartment 54 are provided respectively with journal means or bearings 108 and 110 for respectively journaling the inner ends of transversely disposed, coaxial rock-shafts 112 and 114. The inner end portions of the rockshafts are, of course, spaced transversely apart substantially on the order of the transverse spacing between the legs 96 and 98. A forward portion of the right-hand side wall 14 is provided with an opening 116 in transverse alinement with the bearing 108 and through which the rockshaft 112 projects so that the rockshaft has an outer end portion exteriorly of the side wall 14.

A similarly arranged opening 118 is provided in the other side wall 16 in alinement with the left-hand bearing 110. The rockshaft 114 extends through the opening 118 so as to have an outer end portion exteriorly of the left-hand side wall 16. This portion is visible at 120 in Figures 2 and 3.

An operating arm 122 is rigidly secured to the outer end portion of the right-hand rockshaft 112 and is connected by a rearwardly extending rod 124 to control mechanism contained within the shield or housing 44. As previously stated, the mechanism within the shield or housing 44 is effective to engage or disengage the beaters 36 and 38 and the spreading auger 42. The details of the control means are not important and, for all practical purposes, may be deemed to be the same as those shown in the Brown patent referred to above. The end portion 120 of the left-hand rockshaft 114 may be connected to similar means, the details of which may likewise be considered to be the same as those shown in the Brown patent.

The important thing to note here is that although the outer end portions of the rockshafts 112 and 114 are exteriorly of the compartment 54, the inner end portions of the rockshafts are within this compartment. These inner ends of the rockshafts are connected respectively to the control levers 46 and 48, which themselves are exteriorly of the compartment 54, projecting forwardly and upwardly within convenient reach of an operator carried on an operator's seat 126 mounted on a standard 128 secured to a flared extension 130 of the partition wall 50. For the purpose of effecting a connection between the rockshaft 112 and the lever 46, the former has thereon a short arm 132 apertured at 134 to receive a bolt (not shown) which, in conjunction with the channel shape of the arm 132, affords a suitable connection to the lever 46. The other rockshaft 114 has a similar apertured arm 136 for connection to the lever 48.

The levers 46 and 48 extend upwardly and forwardly respectively through the apertures 90 and 92 in the front wall 18. These apertures are sufficiently large to permit swinging of the levers 46 and 48 in longitudinal upright planes about the common axis of the coaxial rockshafts 112 and 114. In addition to the bearing 108, the right-hand rockshaft 112 is carried in a bearing 138 positioned outside the side wall 14 and secured thereto by a bolt 140 and by one of the bolts 80 that is used to secure the edge flange 76 of the front wall 18 to the side wall 14. A similar bearing, only partly visible at 142 through the opening 118 (Figures 2 and 3) is provided for the left-hand rockshaft 114.

As previously stated, it is a feature of the present invention to support the operator's platform 82 at longitudinally spaced points. The rearward support has been previously covered in the description of the connection of the rear end portions 100 and 102 of the leg 96 and 98 to the lower portion 56 of the partition wall 50. In addition to these supports, the platform 82 is carried by the front wall 18 through the medium of a pair of lever-engageable elements such as arcuate sectors 144 and 146. The details of the sector element 146 are shown in Figure 5. Since both sectors are symmetrical, the description of the sector 146 is deemed to be sufficient disclosure of the details of the sector 144.

The sector 146 comprises a brace 148 of generally triangular construction having a rear upright flange 150 and a lower substantially horizontal flange 152. These flanges are joined by an arcuate flange 154 and the brace is enclosed and rigidified at one side by an upright longitudinal wall 156. The flange 150 is apertured at 158 for receiving a pair of bolts, only one of which is visible at 160 in Figure 1. These bolts pass through a pair of bolt openings 162 in the front wall 18 alongside the lever-receiving aperture 92 (Figure 4). The flange 152 has bolt openings 164 for receiving bolts 166 (Figure 1) for rigidly joining the brace 148 to the leg 98 of the operator's platform 82. The leg 98 has a pair of apertures (not shown) alinable with the bolt openings 164. The general location of these apertures may be appreciated from the disclosure of a pair of similar apertures or bolt openings 168 in the right-hand leg 96, which apertures serve for the mounting of the right-hand sector 144.

It will be observed that both sectors 144 and 146 are arranged at the intersection of the front wall 118 and the operator's platform 82. These sectors adequately and simply support the intermediate portion of the platform 82 from the upright wall 18. Figures 3 and 4 show that the wall 18 has a pair of bolt openings 170 alongside the lever-receiving aperture 90. These bolt openings are, of course, for receiving bolts (not shown) for effecting the mounting of the right-hand sector 144.

The sector 146 includes a lever-engageable portion or element in the form of an arcuate plate 172 provided with an elongated slot 174 along one edge of which is provided a plurality of lever-engageable notches 176. These notches are engageable with detent mechanism 178 conventionally provided on the lever 48. The arcuate plate 172 is rigidly fixed, as by welding, to the arcuate flange 154 of the brace 148. Thus, the sector 146 serves a dual purpose.

The right-hand sector 144 carries a longitudinally slotted, arcuate plate 180 having only a pair of notches (only one of which is visible at 182) for engagement with conventional detent means 184 on the lever 46. In the case of the right-hand sector, only two notches are required, since the mechansim within the shield or housing 44 is either engaged or disengaged. The plurality of notches 176 in the arcuate plate 172 for the left-hand sector 146 is necessary because there are several variations in the incremental feeding of the apron 40.

The platform 82 has a floor portion or foot board 186 for the feet of an operator seated on the seat 126. The platform is conveniently located relative to the tongue 26 so as to make it relatively easy for the operator to mount and dismount.

The over-all appearanec of the front end of the spreader is materially enhanced, as will be seen in Figure 1. The various structural components, particularly the sectors 144 and 146, provide side enclosures relative to the openings 90 and 92 and in addition serve the aforementioned dual function of bracing the platform 82 relative to the wall 18 in addition to providing for fixing of the selected adjusted positions of the levers 46 and 48. The controllable mechanism represented by the interior components consisting of the rockshafts 112 and 114 is completely enclosed and all that are exposed are the ends of the levers 46 and 48. On the other hand, the assembly, as will be clear from Figures 2 and 3, is relatively simple, consisting of relatively few parts that are easily handled.

Various other features of the invention not specifically enumerated will undoubtedly occur to those versed in the art, as likewise will numerous modifications and alterations in the preferred embodiment disclosed, all of which may be achieved without departing from the spirit and scope of the invention as defined in the appended claims.

What is claimed is:

1. Manure spreader body construction, comprising: a pair of spaced apart upright side walls having transversely alined front ends; a transverse partition wall cross-connecting the side walls and having a lower portion rearwardly of the front ends of the side walls so that a compartment is defined ahead of said lower portion and between the front end portions of the side walls; a pair of rockshafts having portions within said compartment; an upright front wall cross-connecting the front ends of the side walls to enclose the front of said compartment, said front wall having first and second pairs of transversely spaced apart apertures therethrough; a platform ahead of the front wall and having a pair of transversely spaced apart legs extending rearwardly respectively through said first pair of apertures and past the rockshafts and connected to the lower portion of said transverse partition wall; means journalling the rockshafts on said legs within said compartment; a pair of control levers extending respectively through said second pair of apertures and connected respectively to the rockshafts within said compartment; and a pair of lever-engageable elements secured in bracing relationship between said legs and the front wall exteriorly of the compartment.

2. Manure spreader body construction, comprising: a pair of spaced apart upright side walls having transversely alined front ends; a transverse partition wall cross-connecting the side walls and having a lower portion rearwardly of the front ends of the side walls so that a compartment is defined ahead of said lower portion and between the front end portions of the side walls; a pair of rockshafts having portions within said compartment; an upright front wall cross-connecting the front ends of the side walls to enclose the front of said compartment, said front wall having first and second pairs of transversely spaced apart apertures therethrough; a platform ahead of the front wall and having a pair of transversely spaced apart legs extending rearwardly respectively through said first pair of apertures and past the rockshafts and connected to the lower portion of said transverse partition wall; means supporting the legs on the front wall; means journalling the rockshafts on said legs within said compartment; and a pair of control levers extending respectviely through said second pair of apertures and connected respectively to the rockshafts within said compartment.

3. Manure spreader body construction, comprising: a pair of spaced apart upright side walls having transversely alined front ends; a transverse partition wall cross-connecting the side walls and having a lower portion rearwardly of the front ends of the side walls so that a compartment is defined ahead of said lower portion and between the front end portions of the side walls; controllable mechanism in said compartment; an upright front wall across the front ends of the side walls to close the front of said compartment; said front wall having first and second apertures therethrough; an operator's platform positioned ahead of the front wall; a support connected to the platform and extending rearwardly through the first aperture and connected to said partition wall; means supporting the controllable mechanism at least in part on that portion of the support between the front and partition walls; means supporting the support on the front wall; and control means positioned ahead of the front wall and proximate to the platform and having an operating connection extending through said second aperture and connected to said controllable mechanism within said compartment.

4. Manure spreader body construction, comprising: a pair of spaced apart upright side walls having transversely alined front ends; a transverse partition wall cross-connecting the side walls and having an upper portion at the upper parts of said alined front ends and a lower portion rearwardly of the front ends of the side walls so that a compartment is defined ahead of said lower portion and between the lower parts of said alined front ends of the side walls; an upright front wall across the front ends of the side walls to close the front of the compartment and including an upper portion adjacent to the upper portion of the partition wall and a lower portion spaced ahead of the lower portion of said partition wall, said front wall further having a pair of transversely spaced apart apertures therethrough; a U-shaped support having its bight ahead of the front wall and its legs extending rearwardly respectively through said apertures and connected to said partition wall; and an operator's foot board carried by the bight of said U-shaped support.

5. Vehicle construction, comprising: a body including a longiutdinal floor, a pair of upright side walls adjoining the floor and having transversely alined front ends and an upright front wall cross-connecting the front ends of the side walls and having a pair of apertures therein spaced apart transversely intermediate the side walls and at a level above the level of the floor; an operator's platform ahead of the front wall and at a level above that of the apertures and including a pair of longitudinal supports spaced apart transversely in accord with the spacing of the apertures in the front wall, said supports extending rearwardly and downwardly and respectively through the apertures to have transversely spaced apart rear end portions proximate to the floor; means supportingly connecting said rear end portions of the supports to the body behind the front wall; means supporting the supports on the front wall; an adjustable control lever carried by the platform and having a portion ahead of the front wall for swinging in an upright longitudinal plane; and a lever-engageable sector cooperative with the lever portion ahead of the front wall and positioned at the junction of and rigidly secured in bracing relationship between the front wall and the platform.

References Cited in the file of this patent

UNITED STATES PATENTS

| | | |
|---|---|---|
| 1,307,044 | Friedrich | June 17, 1919 |
| 1,325,957 | Rude | Dec. 23, 1919 |
| 1,544,413 | Litchfield et al. | June 30, 1925 |
| 2,397,429 | Neighbour et al. | Mar. 26, 1946 |
| 2,504,442 | Neighbour et al. | Apr. 18, 1950 |